Figure 1:
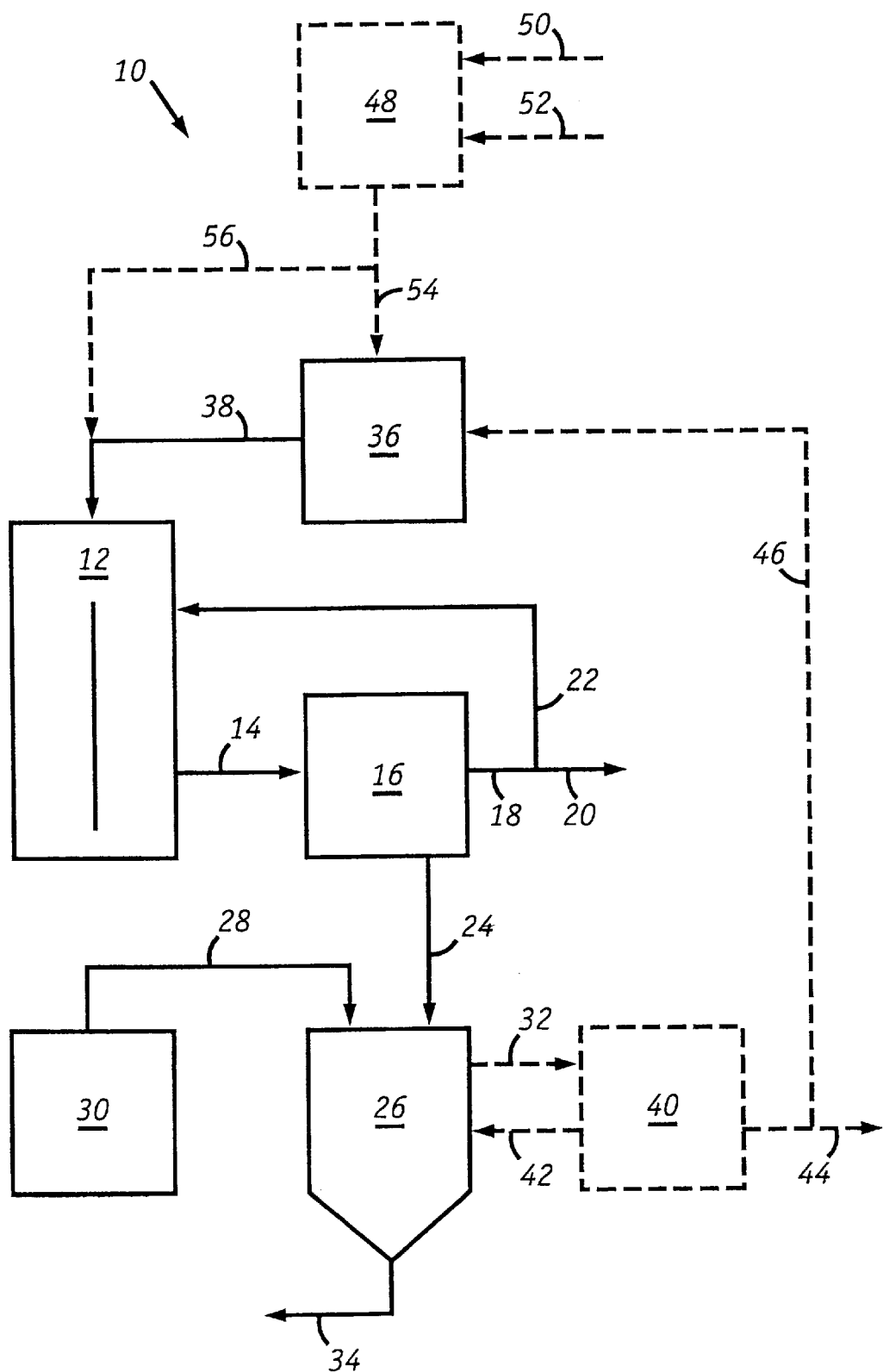

United States Patent [19]
Van Hille et al.

[11] Patent Number: 6,110,370
[45] Date of Patent: Aug. 29, 2000

[54] TREATMENT OF WATER

[75] Inventors: Robert Paul Van Hille; John Richard Duncan; Genevieve Ann Boshoff; Peter Dale Rose, all of Grahamstown, South Africa

[73] Assignee: Water Research Commission, Pretoria, South Africa

[21] Appl. No.: 09/139,556

[22] Filed: Aug. 25, 1998

[30] Foreign Application Priority Data

Aug. 25, 1997 [ZA] South Africa .......................... 97/7616

[51] Int. Cl.⁷ ..................................... C02F 3/32

[52] U.S. Cl. ......................... 210/602; 210/719; 210/757

[58] Field of Search ................................. 210/602, 610, 210/630, 721, 719, 805, 757

[56] References Cited

U.S. PATENT DOCUMENTS

| | | | |
|---|---|---|---|
| 5,316,751 | 5/1994 | Kingsley et al. | 423/571 |
| 5,591,341 | 1/1997 | Jensen | 210/602 |
| 5,614,097 | 3/1997 | Bender et al. | 210/602 |
| 5,645,730 | 7/1997 | Malachosky et al. | 210/665 |
| 5,863,433 | 1/1999 | Behrends | 210/602 |

*Primary Examiner*—David A. Simmons
*Assistant Examiner*—Betsey J. Morrison
*Attorney, Agent, or Firm*—Burns, Doane, Swecker & Mathis, L.L.P.

[57] ABSTRACT

A process for treating acid water process comprises raising the alkalinity of an aqueous component by means of algae, and separating algae from the aqueous component, thereby to obtain a purified alkaline aqueous component. The purified alkaline aqueous component is added to acid water, thereby raising the pH of the acid water.

18 Claims, 2 Drawing Sheets

TREATMENT OF WATER

This invention relates to the treatment of water. It relates more particularly to the treatment of acid water, and still more particularly to the treatment of heavy metal containing acid water, such as acid mine effluent.

According to the invention, there is provided a process for treating acid water, which process comprises raising the alkalinity of an aqueous component by means of algae;

separating algae from the aqueous component, thereby to obtain a purified alkaline aqueous component; and adding the purified alkaline aqueous component to acid water, thereby raising the pH of the acid water.

The process is thus based on the ability of algae to increase the alkalinity, ie raise the pH, of their surrounding medium, ie the aqueous component. This ability is intimately linked to the inorganic carbon ($C_i$) assimilating mechanism of the algae.

The algae, which are thus mostly submerged in the aqueous component, are primarily dependent on dissolved carbon dioxide to fill their photosynthetic carbon requirements. The concentration of dissolved carbon dioxide in water is significantly lower than the concentration of free carbon dioxide in the atmosphere. As a result, some, or certain species of, algae supplement inorganic carbon assimilation by the induction of a mechanism which is dependent on a reduction in the levels of dissolved carbon dioxide and on light. An enzyme, carbonic anhydrase, is an essential component of this system. The enzyme catalyses the interconversion of dissolved $CO_2$ and $H_2CO_3$ to $HCO_3^-$ through enhanced rates of hydration/dehydration. The reactions involved in the accumulation of dissolved inorganic carbon through micro algae are as follows:

$$CO_2 + H_2O \rightarrow H_2CO_3 \quad (1)$$

$$H_2CO_3 \rightarrow HCO_3^- + H^+ \quad (2)$$

$$HCO_3^- \rightarrow CO_2 + OH^- \quad (3)$$

The $HCO_3^-$ is thus converted to carbon dioxide, which is internalized and incorporated into the photosynthetic pathway, and hydroxide ions, which remain in the medium. The hydrogen ions generated by the ionization of the carbonic acid are removed from solution, possibly, it is believed, by accumulation into the algal cells. The resultant increase in hydroxide ion concentration is responsible for the alkalization of the aqueous component.

While, in principle, the process can be used for treating any acid water, the Applicant believes that the process will have particular application in the treatment of heavy metal laden acidic effluents, such as acid mine drainage or effluent. By adding the purified alkaline aqueous component to the acid effluent or water, the majority of the metals are precipitated as metal hydroxides as a result of the increased alkalinity achieved by the addition of the purified alkaline aqueous component thereto.

Any algae having an inorganic carbon assimilating mechanism can, at least in principle, be used in the process. In particular, unicellular algae or cyanobacteria, such as Spirulina, can be used.

The raising of the alkalinity of the aqueous component by means of the algae may be effected by growing the algae in an algal growth vessel containing the aqueous component. The vessel may be fitted with a mixing device in order to keep the algae in suspension and to ensure even distribution of light throughout the algae containing aqueous component or culture. The process may then include, from time to time, or continuously as the case may be, withdrawing some of the algae containing aqueous component from the vessel. This may be effected either actively, eg by pumping the algae containing aqueous component from the vessel, or passively, eg by means of gravity flow thereof from the vessel. Typically, the vessel may comprise an algal high rate oxidation pond.

The process may thus include also, either from time to time or continuously as desired, feeding fresh or make-up aqueous component into the algal growth vessel. Typically, the aqueous component may comprise normal water, ie unacidified water not contaminated with unwanted components such as heavy metals. Thus, the water may be water suitable for domestic purposes, untreated river water not heavily polluted, or the like. The make-up water can be supplemented, eg periodically, with phosphate and nitrate salts to promote algal growth in the algal growth vessel. Thus, the aqueous component may be prepared or conditioned in an algal feed preparation tank, where the supplements such as the phosphate and nitrite salts, are added to the water, with the aqueous component then being transferred, eg by pumping, to the algal growth vessel.

However, instead of using normal water, an effluent, which will not retard algal growth, may also be used as the aqueous component.

The process may include feeding a non-sulphate or low sulphate containing carbon source stream, such as sewage, into an anaerobic digester together with carbon dioxide, generating bicarbonate ions in the anaerobic digester, and feeding a bicarbonate rich stream from the digester to the algal growth vessel as the, or as part of the, aqueous component. When the process is supplemented with additional bicarbonate in this fashion, the potential impact of reactions (1) and (2) is significantly reduced since an additional bicarbonate source is thereby provided.

The separation of the algae from the aqueous component may be effected by passing the algae containing aqueous component through at least one separation device. Thus, the algae containing aqueous component may initially be passed through a primary screen, which may typically be located at an outlet from the algal growth vessel, to prevent large amounts of algae from flushing out of the growth vessel with the alkaline aqueous component. Typically, the screen will be sized between 100 microns and 300 microns.

Further separation of the algae from the aqueous component may be effected by any appropriate means known to those skilled in the art. For example, the process may also include passing the alkaline aqueous component, after it has passed through the primary screen, through at least one filter. A primary and secondary filter can then be used, in which case the function of the primary filter is to trap the majority of the algae which pass through the primary screen. The primary filter may also comprise a mesh having openings between 100 microns and 300 microns. The primary filter will thus also constitute an algae harvesting stage from which algae which are removed from the aqueous component are harvested for further processing or return to the algal growth vessel. A plurality of the primary filters can be provided, if desired. The secondary filter then acts as a final screen to remove any algae which have passed through the primary screen and the primary filter. The secondary filter may thus be adapted to remove algae growth having a length dimension of 10–80 micron and a width dimension of 5–15 micron. Thus, the secondary filter may comprise a sand filter.

The aqueous component emerging from the secondary filter will thus consist of high pH water containing a minimum of organic material.

The addition of the purified alkaline aqueous component to the acid water or effluent may be effected in a reaction vessel into which both these components or streams are introduced. As discussed hereinbefore, the effluent is typically acid mine effluent or drainage water having a low pH, typically around 2–4, and a high heavy metal load, typically around 10–3000 ppm, comprising heavy metals such as iron, copper, lead and zinc. As the pH of the acid water increases due to the purified alkaline aqueous component mixed therewith, the metals precipitate out. Sludge, containing the precipitated heavy metals, is removed from the bottom of the reaction vessel and may be further processed, eg to recover valuable metals therefrom.

Purified effluent is withdrawn from the reaction vessel, and may be subjected to further processing. For example, when it has a low sulphate loading, it may merely be subjected to final polishing to remove trace amounts of metal. Such polishing may comprise treating it with a biosorbent, such as Azolla filiculoides. When the purified effluent has a high sulphate loading, the further processing may instead, or additionally, comprise removing sulphates from the water. The sulphate removal may comprise passing the water through an anaerobic digester, and a sulphide containing stream may then optionally be passed from the anaerobic digester to the reaction vessel.

The invention will now be described in more detail with reference to the accompanying drawings and the subsequent non-limiting examples.

Figure 2:
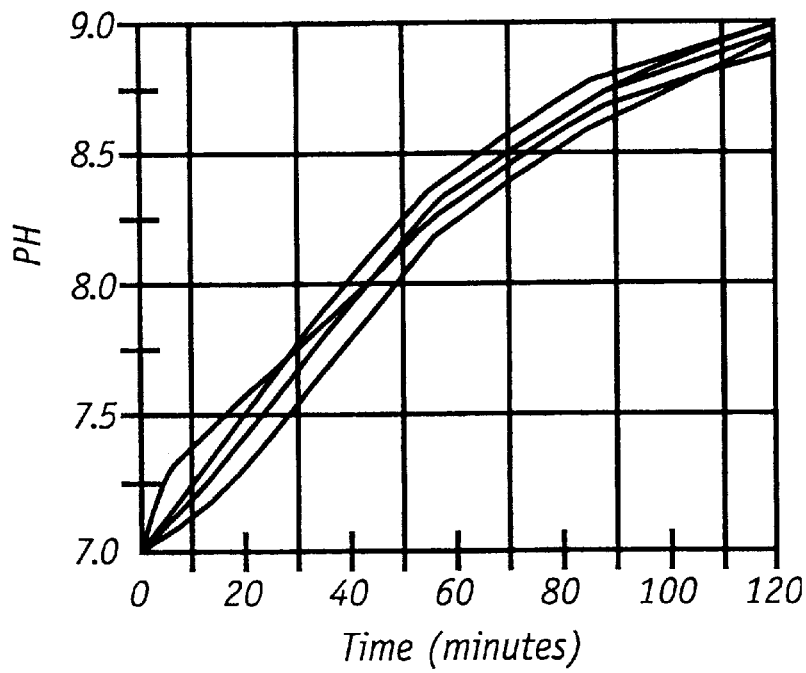
Figure 3:
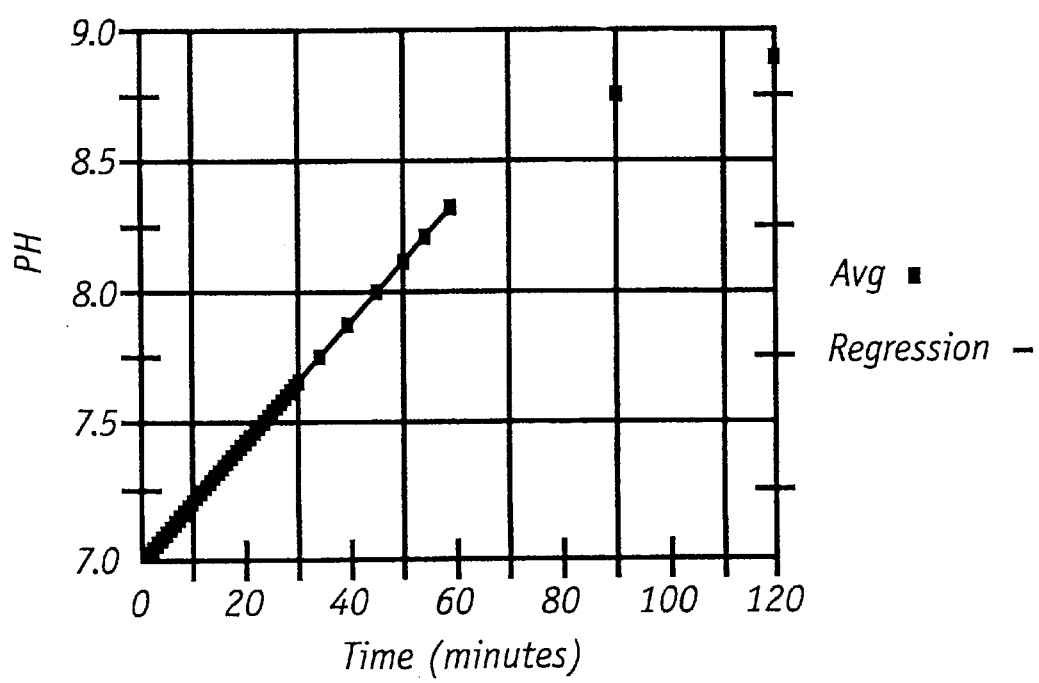

In the drawings,

FIG. 1 shows a simplified flow diagram of a process according to the invention for treating acid mine effluent or drainage water;

FIG. 2 is a plot of pH against time, and shows, in respect of Example 3, the increase of pH against time for 5 replicates using a starting concentration of 5 g/l algal wet mass; and FIG. 3 is also a plot of pH against time, and shows, for Example 3, the mean data for the increase of pH against time for 5 replicates. Regression over the first 60 minutes indicates a linear relationship ($R^2 > 0,999$) between pH increase and time.

Referring to FIG. 1, reference numeral 10 generally indicates a process according to the invention for treating acid mine drainage water or effluent.

The process 10 comprises an algal growth vessel 12, having an outlet at a relatively high level. A flow line 14 leads from the algal growth vessel 12 to a solid/liquid separation stage 16, with an algae withdrawal line 18 leading from the stage 16. The line 18 leads to an algal disposal line 20, and/or to an algal return line 22 for returning algae to the vessel 12. Typically, the algal growth vessel 12 is an algal high rate oxidation pond. The separation stage 16 may, for example, comprise a screen at the outlet of the vessel 12, a primary filter and a secondary filter; however, any other suitable separation apparatus can instead be used.

An alkaline water flow line 24 leads from the stage 16 into a reaction vessel 26. A raw effluent flow line 28 leads into the reaction vessel 26 from a raw effluent hold-up vessel 30, with a pump (not shown) typically being provided in the flow line 28. A treated effluent withdrawal line 32 leads from the reaction vessel 26. A sludge withdrawal line 34 leads from the bottom of the reaction vessel 26.

An algal feed preparation vessel 36 is also provided. A flow line 38, typically fitted with a pump (not shown), leads from the vessel 36 to the algal growth vessel 12.

In use, a supply of normal water, as hereinbefore defined, is contained in the algal feed preparation vessel 36, and is periodically supplemented with phosphate and nitrate salts.

This aqueous component is thus pumped, by means of the pump and the flow line 38, into the algal growth vessel 12 as desired.

The algal growth vessel 12 contains a mixing device (not shown), such as a stirrer or paddle wheel, to keep the algae in suspension and to ensure even distribution of light throughout the culture comprising the algal containing aqueous component therein.

In the growth vessel 12, the alkalinity of the aqueous component thus increases, by the inorganic carbon ($C_i$) assimilating mechanism, as hereinbefore described, ie in accordance with reactions (1), (2) and (3) hereinbefore described. The pH of the aqueous component typically increases from about 7 to about 9–11. Alkaline aqueous component which exits the vessel 12 through its outlet passes through the separation stage 16.

Thus, when the separation stage 16 comprises a primary screen, primary filter and secondary filter as hereinbefore described, the aqueous component will first pass through the primary screen which prevents large amounts of algae from flushing out of the growth vessel 12 with the alkaline aqueous component. The screen is then typically removable, to facilitate harvesting of algae should the culture in the vessel 12 become too concentrated. The alkaline aqueous component, still containing some algae, then passes into the primary filter. Algae trapped in or on the filter is harvested, and removed along the flow line 18 for further processing or disposal along line 20, and/or for addition to the growth vessel 12 along line 22, depending on requirements. A number of the primary filters 18 can be provided. Alkaline aqueous components, still containing traces of algae, then passes into the secondary filter 24 which acts as a final screen to remove residual algae from the alkaline aqueous component. As indicated, the secondary filter typically comprises a sand filter which will effectively remove residual algae, is inexpensive and will not retard the flow rate of the aqueous component.

The resultant alkaline aqueous component which passes from the secondary filter along the flow line 24 thus has a high pH and a minimum of organic material. This facilitates the production, in the reaction vessel 26 into which it passes, of a sludge that is almost entirely inorganic. The less extraneous material in the sludge, the greater the potential for downstream processing of the sludge.

Raw effluent from the hold-up vessel 30 passes along the flow line 28 into the reaction vessel 26. Precipitation of heavy metals occurs in the reaction vessel 26 by mixing of the alkaline aqueous component and the raw effluent. The effluent typically has a low pH of about 2–4, and a high heavy metal load, typically about 10–3000 ppm. As the pH in the reaction vessel 26 increases, the metals precipitate out of solution. The retention time and the ratio of aqueous component to raw effluent will depend on the nature of the effluent being treated. The bottom of the vessel 26 may be cone-shaped to allow for easy collection and removal of the sludge along the flow line 34 for disposal or further treatment. Treated effluent is removed along the flow line 32 and this may be effected either actively, eg by means of a pump, or passively, under gravity.

The treated effluent which is removed along the flow line 32 passes into an optional treatment stage 40, which is indicated in broken line. The stage 40 may comprise an anaerobic sulphate digester if the effluent has a high sulphate load, with a sulphide containing stream, such as hydrogen sulphide gas, then being passed back to the reaction vessel 26 along a flow line 42. The sulphide containing stream assists in metal precipitation, as metal sulphides, in the reaction vessel 26 and improves the sludge characteristics, ie enhances the settling and de-watering properties of the primarily metal hydroxide sludge. When the effluent from the reactor 26 has a low sulphate load, the stage 40 can comprise a polishing column. Effluent or overflow from the stage 40 is withdrawn along a flow line 44. A part thereof can, when the stage 40 comprises the anaerobic digester, be fed to the algal feed preparation vessel 36 along a flow line 46 to supplement the algal feed to the vessel 12.

If desired, the process 10 may include an anaerobic digester 48, which is also indicated in broken line. The digester 48 can be an upflow digester. A non-sulphate or low sulphate carbon source aqueous stream, typically sewage, enters the digester 48 along a flow line 50. Carbon dioxide also enters the digester 48 along a flow line 52. The carbon dioxide enhances microbial generation of bicarbonate in the digester. A bicarbonate, nitrate and phosphate rich stream is withdrawn, as an aqueous overflow, from the digester and passes along a flow line 54 to the algal feed preparation vessel 36, and/or along a flow line 56 directly to the vessel 12. Sulphates can, if desired, be added to the digester 48. The use of the digester 48 has a cost advantage over having to supplement the feed to the vessel 12 separately with bicarbonate, nitrate and phosphate salts. It also allows for disposal of sewage. In addition, since the bicarbonate is not in a salt form, there is no addition of cations which could contribute excess hardness to the treated water.

EXAMPLE 1

A 5 l pilot plant which was similar to the process 10 save that the bicarbonate generating anaerobic digester 48 was not employed and that a sulphide rich stream from the anaerobic sulphate digester 40 was not fed back into the reaction vessel 26, was operated continuously for 21 days.

The algal growth vessel 12 comprised a transparent perspex container with a volume of approximately 10 l and with a Spirulina culture volume of five liters. The culture was agitated by means of a magnetic stirrer, but in a larger pilot plant a paddle wheel would be used for keeping the algae in suspension.

The growth vessel 12 was fed tap water, periodically supplemented with nitrate and phosphate salts, at a rate of 60 ml/hour. This nutrient supplementation could, however be dispensed with if the algae were fed on digested sewage, for example. An overflow port ensured that the volume of the algal vessel did not exceed 5L and the alkaline overflow passed through a mesh filter into the reaction vessel 26, also at a rate of 60 ml/hour.

Raw effluent, having a composition as set out in Table 1, was pumped directly into the reaction vessel 26 at a rate of 60 ml/hour. Therefore the volume in the reaction vessel increased at a rate of 120 ml/hour. The reaction vessel 26 consisted of a cylindrical plastic reactor with a volume of approximately 10 l. The cylinder was modified to have a cone shaped bottom from where the settled sludge could be removed through an outlet at the bottom of the cone. A second outlet, two thirds of the way up the reactor, limited the volume of the reactor to approximately 7 l. The overflow from the reaction vessel was fed into an anaerobic sulphate digester 40. Prior to sludge removal the rate of overflow was approximately 120 ml/hour, but after a sludge removal event the level of the reactor would drop and no overflow would occur until the liquid portion had again risen to the level of the outlet.

The anaerobic sulphate digester 40 had a volume of 10 l and a maximum retention time of 4 days. The reaction vessel overflow was fed into the bottom of the digester, and there was an overflow port near the top of the digester. A lactate based defined growth medium was used as the carbon source for the digester, although on a larger scale a cheap or waste carbon source would be used, since it is known that on larger anaerobic digesters, using a waste carbon source does not have a negative effect on the efficiency of the system.

TABLE 1

Composition of raw effluent, and discharge specifications

| Component | Units | Result | Specifications |
|---|---|---|---|
| pH | | 1.88 | min 5.5, max 9.5 |
| Sulphate | mg/lSO$_4$ | 4415.51 | |
| Chloride | mg/l | 984 | |
| Bicarbonate | mg/lCaCO$_3$ | 0 | |
| Copper | mg/l | 3.49 | max 1.0 |
| Zinc | mg/l | 7.16 | max 5.0 |
| Lead | mg/l | 2.35 | max 0.1 |
| Iron | mg/l | 98.95 | max 0.3 |

The overflows from both the precipitation reaction vessel 26 and the anaerobic sulphate digester 40 were monitored daily. The initial precipitation step removed over 99% of the iron from solution and between 85% and 95% of the other three metals (copper, zinc and lead), although there was no reduction in the sulphate levels. The pH of the reaction vessel overflow varied between 8,0 and 8,2, indicating that there had been effective neutralization of the acid effluent.

The metal concentrations and pH after the anaerobic sulphate digestion step are shown in Table 2.

TABLE 2

Composition of anaerobic digester overflow, and discharge specifications

| Component | Units | Result | % Reduction | Specifications |
|---|---|---|---|---|
| pH | | 8.18 | | min 5.5, max 9.5 |
| Sulphate | mg/lSO$_4$ | 295.83 | 89.07 | |
| Copper | mg/l | 0.100 | 94.30 | 1.0 |
| Zinc | mg/l | 0.221 | 93.82 | 5.0 |
| Lead | mg/l | 0.057 | 95.14 | 0.1 |
| Iron | mg/l | 0.263 | 99.47 | 0.3 |

The above result indicate that over a 21 day period, treating over 30 l of effluent, the system efficiently reduced the concentrations of metal in solution to well within the discharge limits for all four metals tested. The sulphate levels and pH also fall within the acceptable discharge levels.

EXAMPLE 2

It was determined that, in the treatment of saline tannery effluent using the alga Spirulina in a ponding system, algae can be successfully cultivated in 2500 m$^2$ ponds on a non-defined growth media. This step effectively demonstrates the successful operation of the growth vessel 12 in the process 10, on a commercial scale.

EXAMPLE 3

Alkalization Rates
Preliminary Experiments

Preliminary experiments were performed to determine the optimum algal concentration so that the rate of alkalinity generated per gram of biomass was high, while at the same time being high enough to generate a sufficient quantity of alkalinity. If the algal concentration is too high the degree of light penetration (light being essential for carbon assimilation activity) is reduced and the net efficiency of the system is reduced. An algal concentration of 0,25 g wet mass per 50 ml appeared to give the best result and further experiments were conducted at this concentration.

Experimental Design

A 100 ml conical flask was half filled (50 ml) with 0,5 mM sodium bicarbonate solution and the pH was adjusted to 7,00. The algae were then added and, if necessary, the pH was re-adjusted to 7,00. The experiment was initiated by switching on a bank of lights. pH measurements were taken every minute for the first 30 minutes, at 5 minute intervals for the next 30 minutes and at half hour intervals for the duration of the experiment. A total of 5 replicates were performed, in the absence of inhibitors and at controlled T° of between 25° C. and 30° C. The results are shown in FIG. 2.

A mean of the 5 replicates was taken and the standard deviations from the mean determined. In all cases the standard deviation was below 0,1 unit. A linear regression indicated that alkalization occurred at a constant rate over the first 60 minutes. The $R^2$ value over the first hour was 0,999. The results for the mean and regression data are shown in FIG. 3.

The net pH change over the 60 minute period was 1,31 units. By using the standard curve generated from the hydroxide titrations this represents the equivalent of adding 367 $\mu$moles of $OH^-$ ions. Therefore it can be estimated that 1 g of Spirulina (wet mass) is capable of generating 1468 $\mu$moles of hydroxide ions per hour under the experimental conditions.

The Applicant believes that the process of the invention, which thus uses algal generated alkalinity, rather than alkaline chemicals such as lime or caustic soda, to precipitate metals from solution, has advantages over chemical processing of acid mine drainage water, particularly as regards costs. When acid mine drainage water is treated with chemicals such as lime, addition thereof usually takes place on a constant basis, resulting in a heavy usage of chemicals. Another important advantage of the process 10 over the use of chemicals, is that there is no increase of cations, which increases the hardness of the water, since in the process 10 all the bicarbonate is biologically generated. A serious problem with using lime for precipitating metals from waste water is the amount of calcium added, which negatively influences the quality of the water eventually discharged. In the process 10, alkalinity is continuously produced by the algae as a by-product of photosynthesis, and the running costs are thus dramatically reduced as compared to using chemicals. Furthermore, in the process of the invention where the algae are removed from the aqueous component prior to contacting thereof with the raw effluent, the problem of possible kill-off of the algae through heavy metals such as copper, lead and zinc is avoided. In other words, the process of the invention can be sustained without the need for frequent addition of fresh algal biomass to the process.

What is claimed is:

1. A process for treating acid water, which process comprises submerging algae in an aqueous component, thereby to raise the alkalinity of the aqueous component by means of the algae;

separating algae from the aqueous component, thereby to obtain a purified alkaline aqueous component; and adding the purified alkaline aqueous component to acid water, thereby raising the pH of the acid water.

2. A process according to claim 1, wherein the acid water is a heavy metal laden acidic effluent, and wherein, by adding the purified alkaline aqueous component to the acid effluent, the majority of the metals are precipitated as metal hydroxides as a result of the increased alkalinity thereby achieved.

3. A process according to claim 1, wherein, to raise the alkalinity of the aqueous component by means of the algae, the algae are grown in an algal growth vessel containing the aqueous component, with the vessel being fitted with a mixing device by means of which the algae are kept in suspension and even distribution of light throughout the algae containing aqueous component is ensured.

4. A process according to claim 3, which includes withdrawing some of the algae containing aqueous component from the vessel, and feeding fresh or make-up aqueous component into the algal growth vessel.

5. A process according to claim 3, wherein the aqueous component comprises normal water not contaminated with unwanted components, the normal water optionally being supplemented with phosphate and/or nitrate salts to promote algal growth in the algal growth vessel.

6. A process according to claim 3, wherein the aqueous component comprises an effluent which does not retard algal growth.

7. A process according to claim 3, which includes feeding a non-sulphate or low sulphate containing carbon source stream into an anaerobic digester together with carbon dioxide, generating bicarbonate ions in the anaerobic digester, and feeding a bicarbonate rich stream from the digester to the algal growth vessel as the, or as part of the, aqueous component.

8. A process according to claim 1, wherein the addition of the purified alkaline aqueous component to the acid water is effected in a reaction vessel into which the purified alkaline aqueous component and the acid water are introduced, with sludge being removed from the bottom of the reaction vessel, and purified effluent being withdrawn from the reaction vessel.

9. A process according to claim 8, wherein the purified effluent, when it has a low sulphate loading, is subjected to final polishing by treating it with a biosorbent.

10. A process according to claim 8, wherein the purified effluent, when it has a high sulphate loading, is subjected to sulphate removal by passing it through an anaerobic digester, with a sulphide containing stream optionally being passed from the anaerobic digester to the reaction vessel.

11. A process for treating acid water, which process comprises in an algal growth vessel, growing algae in an aqueous component, thereby to raise the alkalinity of the aqueous component by means of the algae;

keeping the algae in suspension and ensuring even distribution of light through the algae containing aqueous component, by means of a mixing device fitted to the algal growth vessel;

separating algae from the aqueous component, thereby to obtain a purified alkaline aqueous component; and adding the purified alkaline aqueous component to acid water, thereby raising the pH of the acid water.

12. A process according to claim 11, which includes withdrawing some of the algae containing aqueous component from the vessel, and feeding fresh or make-up aqueous component into the algal growth vessel.

13. A process according to claim 11, wherein the aqueous component comprises normal water not contaminated with unwanted components, the normal water optionally being supplemented with phosphate and/or nitrate salts to promote algal growth in the algal growth vessel.

14. A process according to claim 11, wherein the aqueous component comprises an effluent which does not retard algal growth.

15. A process according to claim 11, which includes feeding a non-sulphate or low sulphate containing carbon source stream into an anaerobic digester together with carbon dioxide, generating bicarbonate ions in the anaerobic digester, and feeding a bicarbonate rich stream from the digester to the algal growth vessel as the, or as part of the, aqueous component.

16. A process for treating acid water, which process comprises submerging algae in an aqueous component, thereby to raise the alkalinity of the aqueous component by means of the algae;

separating algae from the aqueous component, thereby to obtain a purified alkaline aqueous component;

introducing the purified alkaline aqueous component and acid water into a reaction vessel so that the pH of the acid water is raised by means of the purified alkaline aqueous component;

removing sludge from the bottom of the reaction vessel; and withdrawing purified effluent from the reaction vessel.

17. A process according to claim 16, wherein the purified effluent, when it has a low sulphate loading, is subjected to final polishing by treating it with a biosorbent.

18. A process according to claim 16, wherein the purified effluent, when it has a high sulphate loading, is subjected to sulphate removal by passing it through an anaerobic digester, with a sulphide containing stream optionally being passed from the anaerobic digester to the reaction vessel.

* * * * *